(12) United States Patent
Wang et al.

(10) Patent No.: US 10,665,553 B1
(45) Date of Patent: May 26, 2020

(54) DATA SELECTOR BASED ON THRESHOLD VOLTAGE DEFINED

(71) Applicant: Ningbo University, Zhejiang (CN)

(72) Inventors: Pengjun Wang, Zhejiang (CN); Liwei Li, Zhejiang (CN); Yuejun Zhang, Zhejiang (CN); Bo Chen, Zhejiang (CN); Gang Li, Zhejiang (CN)

(73) Assignee: Ningbo University, Zhejiang (CN)

( * ) Notice: Subject to any disclaimer, the term of this patent is extended or adjusted under 35 U.S.C. 154(b) by 0 days.

(21) Appl. No.: 16/699,124

(22) Filed: Nov. 29, 2019

(30) Foreign Application Priority Data

Nov. 30, 2018 (CN) .......................... 2018 1 1451314

(51) Int. Cl.
| *H03K 19/00* | (2006.01) |
| *H01L 23/00* | (2006.01) |
| *H03K 19/20* | (2006.01) |
| *H03K 19/003* | (2006.01) |

(52) U.S. Cl.
CPC ..... *H01L 23/576* (2013.01); *H03K 19/00315* (2013.01); *H03K 19/20* (2013.01)

(58) Field of Classification Search
None
See application file for complete search history.

(56) References Cited

U.S. PATENT DOCUMENTS

| 10,164,768 | B1* | 12/2018 | Ramaraju | ............... H04L 9/003 |
| 2013/0339914 | A1* | 12/2013 | Vrudhula | .............. G06F 30/327 |
| | | | | 716/104 |
| 2017/0187382 | A1* | 6/2017 | Vrudhula | ........... H03K 19/0813 |

* cited by examiner

*Primary Examiner* — Anh Q Tran
(74) *Attorney, Agent, or Firm* — JCIPRNET

(57) ABSTRACT

A data selector based on TVD includes two AND gates, an OR gate, and three buffers, wherein the two AND gates and the OR gate adopt a three-phase dual-track pre-charge logic as a work logic. The data selector fulfills one time of evaluation operation and has three stages in one cycle. When a discharge control signal and a pre-charge control signal are at low levels, the data selector enters a pre-charge stage. When an evaluation signal is changed to a high level from a low level, the data selector implements the evaluation operation to fulfill the circuit function. When the discharge control signal is changed to a high level from the low level, the data selector enters a discharge state and gets ready for the next evaluation operation.

5 Claims, 6 Drawing Sheets

DATA SELECTOR BASED ON THRESHOLD VOLTAGE DEFINED

CROSS-REFERENCE TO RELATED APPLICATION

This application claims the priority benefit of China application serial no. 201811451314.8, filed on Nov. 30, 2018. The entirety of the above-mentioned patent application is hereby incorporated by reference herein and made a part of this specification.

TECHNICAL FIELD

The invention relates to a data selector, in particular to a data selector based on threshold voltage defined (TVD).

DESCRIPTION OF RELATED ART

With the development of very-large-scale integrated circuits and information security technology, the protection of intellectual property (IP) has received more and more attention. However, attacks on IP cores are emerging endlessly, and reverse engineering is an approach to quickly acquire a core technology of a designer. An attacker analyzes the internal structure of a chip through the reverse engineering to extract a circuit netlist so as to grasp the actual function of the chip, which imperils the legitimate interests of the designer. The behavior of cloning the chip through the reverse engineering is a more serious violation on the intellectual property of the designer. Besides, with regard to an encryption chip, the attacker acquires physical information, such as power consumption and electromagnetic radiation, leaked in the encrypting process of different round functions and uses a statistical method, namely a side channel attack (SCA), to infer a secret key without using a cryptographic algorithm, wherein differential power analysis (DPA) is the most common and efficient attack manner in SCA. DPA attack defense has become a hot topic in current research, and main technologies involved include: adiabatic dynamic differential logic (ADDL), LUT based differential logic (LBDL), sense amplifier based logic (SABL), and the like. However, these logics may still be breakthrough points of a DPA attack when output load capacitances are not completely the same. Thus, a device based on reverse engineering resistance and differential power analysis resistance has a broad application prospect.

A data selector is one of digital devices commonly used in a digital circuit system and is a fundamental part of an arithmetic operator. The data selector is a combined logic circuit that sends a designated input signal selected from a group of input signals according to a given input address code to an output terminal, and has been widely applied to various cryptographic devices and systems and testable designs nowadays. In terms of the implementation technology of the data selector, a data selector based on a static complementary logic has a poor reverse engineering resistant capability due to its clear circuit structure, is likely to be subjected to differential power analysis attacks due to the lack of independence of energy consumption and processed data, and has high power consumption.

BRIEF SUMMARY OF THE INVENTION

The technical issue to be settled by the invention is to provide a data selector based on TVD. The data selector has low power consumption, good differential power analysis attack resistance, and good reverse engineering resistance.

The technical solution adopted by the invention to settle the above-mentioned technical issue is as follows: a data selector based on TVD includes two AND gates, an OR gate, and three buffers, wherein the two AND gates and the OR gate adopt a three-phase dual-track pre-charge logic as a work logic. The AND gates and the OR gate each have a pre-charge control terminal, a discharge control terminal, an evaluation control terminal, a first input terminal, a first inverting input terminal, a second input terminal, a second inverting input terminal, an output terminal, and an inverting output terminal. The two AND gates are respectively referred to as a first AND gate and a second AND gate, and the three buffers are respectively referred to as a first buffer, a second buffer, and a third buffer. The discharge control terminal of the first AND gate, the discharge control terminal of the second AND gate, and an input terminal of the first buffer are connected, and a connecting terminal of the discharge control terminal of the first AND gate, the discharge control terminal of the second AND gate, and the input terminal of the first buffer is a discharge control terminal of the data selector and allows a discharge control signal to be accessed therein. The pre-charge control terminal of the first AND gate, the pre-charge control terminal of the second AND gate, and an input terminal of the second buffer are connected, and a connecting terminal of the pre-charge control terminal of the first AND gate, the pre-charge control terminal of the second AND gate, and the input terminal of the second buffer is a pre-charge control terminal of the data selector and allows a pre-charge control signal to be accessed therein. The evaluation control terminal of the first AND gate, the evaluation control terminal of the second AND gate, and an input terminal of the third buffer are connected, and a connecting terminal of the evaluation control terminal of the first AND gate, the evaluation control terminal of the second AND gate, and the input terminal of the third buffer is an evaluation control terminal of the data selector and allows an evaluation control signal to be accessed therein. An output terminal of the first buffer is connected to the discharge control terminal of the OR gate, an output terminal of the second buffer is connected to the pre-charge control terminal of the OR gate, and an output terminal of the third buffer is connected to the evaluation control terminal of the OR gate. The first input terminal of the first AND gate is a first input terminal of the data selector and allows a first input signal to be accessed therein, the first inverting input terminal of the first AND gate is a first inverting input terminal of the data selector and allows an inversion signal of the first input signal to be accessed therein, the first input terminal of the second AND gate is a second input terminal of the data selector and allows a second input signal to be accessed therein, and the first inverting input terminal of the second AND gate is a second inverting input terminal of the data selector and allows an inversion signal of the second input signal to be accessed therein. The second inverting input terminal of the first AND gate is connected to the second input terminal of the second AND gate, and a connecting terminal of the second inverting input terminal of the first AND gate and the second input terminal of the second AND gate is a selection terminal of the data selector and allows a selection signal to be accessed therein. The second input terminal of the first AND gate is connected to the second inverting input terminal of the second AND gate, and a connecting terminal of the second input terminal of the first AND gate and the second inverting input terminal of the second AND gate is an inverting selection terminal of the data selector and allows an inversion signal of the selection signal to be accessed therein. The output terminal of the first AND gate is connected to the first input terminal of the OR gate, the inverting output terminal of the first AND gate is connected to the first inverting input terminal of the OR gate, the output terminal of the second AND gate is connected to the second input terminal of the OR gate, and the inverting output terminal of the second AND gate is connected to the second inverting input terminal of the OR gate. The output terminal of the OR gate is an output terminal of the selector, and the inverting output terminal of the OR gate is an inverting output terminal of the selector.

Each AND gate includes a first PMOS transistor, a second PMOS transistor, a third PMOS transistor, a fourth PMOS transistor, a fifth PMOS transistor, a first NMOS transistor, a second NMOS transistor, a third NMOS transistor, a fourth NMOS transistor, a fifth NMOS transistor, a sixth NMOS transistor, a seventh NMOS transistor, an eighth NMOS transistor, a ninth NMOS transistor, a tenth NMOS transistor, an eleventh NMOS transistor, a twelfth NMOS transistor, a thirteenth NMOS transistor, a fourteenth NMOS transistor, a fifteenth NMOS transistor, a sixteenth NMOS transistor, a seventeenth NMOS transistor, an eighteenth NMOS transistor, a nineteenth NMOS transistor, a twentieth NMOS transistor, and a twenty-first NMOS transistor, wherein a source of the first PMOS transistor is accessed to a power supply. A gate of the first PMOS transistor, a gate of the first NMOS transistor, and a gate of the fourth NMOS transistor are connected, and a connecting terminal of the gate of the first PMOS transistor, the gate of the first NMOS transistor, and the gate of the fourth NMOS transistor is the discharge control terminal of the AND gate. A drain of the first PMOS transistor, a source of the second PMOS transistor, a source of the third PMOS transistor, a source of the fourth PMOS transistor, and a source of the fifth PMOS transistor are connected. A gate of the second PMOS transistor is connected to a gate of the fifth PMOS transistor, and a connecting terminal of the gate of the second PMOS transistor and the gate of the fifth PMOS transistor is the pre-charge control terminal of the AND gate. A drain of the second PMOS transistor, a drain of the third PMOS transistor, a drain of the first NMOS transistor, a drain of the second NMOS transistor, a gate of the fourth PMOS transistor, and a gate of the third NMOS transistor are connected, and a connecting terminal of the drain of the second PMOS transistor, the drain of the third PMOS transistor, the drain of the first NMOS transistor, the drain of the second NMOS transistor, the gate of the fourth PMOS transistor, and the gate of the third NMOS transistor is the output terminal of the AND gate. A gate of the third PMOS transistor, a gate of the second NMOS transistor, a drain of the fourth PMOS transistor, a drain of the third NMOS transistor, a drain of the fifth PMOS transistor, and a drain of the fourth NMOS transistor are connected, and a connecting terminal of the gate of the third PMOS transistor, the gate of the second NMOS transistor, the drain of the fourth PMOS transistor, the drain of the third NMOS transistor, the drain of the fifth PMOS transistor, and a drain of the fourth NMOS transistor is the inverting output terminal of the AND gate. A source of the first NMOS transistor is grounded, a source of the second NMOS transistor, a drain of the fifth NMOS transistor, a drain of the sixth NMOS transistor, a drain of the seventh NMOS transistor, and a drain of the eighth NMOS transistor are connected, a source of the third NMOS transistor, a drain of the ninth NMOS transistor, a drain of the tenth NMOS transistor, a drain of the eleventh NMOS transistor, and a drain of the twelfth NMOS transistor are connected, and a source of the fourth NMOS transistor is grounded. A gate of the fifth NMOS transistor, a gate of the seventh NMOS transistor, a gate of the tenth NMOS transistor, and a gate of the twelfth NMOS transistor are connected, and a connecting terminal of the gate of the fifth NMOS transistor, the gate of the seventh NMOS transistor, the gate of the tenth NMOS transistor, and the gate of the twelfth NMOS transistor is the first input terminal of the AND gate. A source of the fifth NMOS transistor is connected to a drain of the thirteenth NMOS transistor. A gate of the sixth NMOS transistor, a gate of the eighth NMOS transistor, a gate of the ninth NMOS transistor, and a gate of the eleventh NMOS transistor are connected, and a connecting terminal of the gate of the sixth NMOS transistor, the gate of the eighth NMOS transistor, the gate of the ninth NMOS transistor, and the gate of the eleventh NMOS transistor is the first inverting input terminal of the AND gate. A source of the sixth NMOS transistor is connected to a drain of the fourteenth NMOS transistor, a source of the seventh NMOS transistor is connected to a drain of the fifteenth NMOS transistor, a source of the eighth NMOS transistor is connected to a drain of the sixteenth NMOS transistor, a source of the ninth NMOS transistor is connected to a drain of the seventeenth NMOS transistor, a source of the tenth NMOS transistor is connected to a drain of the eighteenth NMOS transistor, a source of the eleventh NMOS transistor is connected to a drain of the nineteenth NMOS transistor, and a source of the twelfth NMOS transistor is connected to a drain of the twentieth NMOS transistor. A gate of the thirteenth NMOS transistor, a gate of the thirteenth NMOS transistor, a gate of the fourteenth NMOS transistor, a gate of the nineteenth NMOS transistor, and a gate of the twentieth NMOS transistor are connected, and a connecting terminal of the gate of the thirteenth NMOS transistor, the gate of the thirteenth NMOS transistor, the gate of the fourteenth NMOS transistor, the gate of the nineteenth NMOS transistor, and the gate of the twentieth NMOS transistor is the second input terminal of the AND gate. A source of the thirteenth NMOS transistor, a source of the fourteenth NMOS transistor, a source of the fifteenth NMOS transistor, a source of the sixteenth NMOS transistor, a source of the seventeenth NMOS transistor, a source of the eighteenth NMOS transistor, a source of the nineteenth NMOS transistor, a source of the twentieth NMOS transistor, and a drain of the twenty-first NMOS transistor are connected. A gate of the fifteenth NMOS transistor, a gate of the sixteenth NMOS transistor, a gate of the seventeenth NMOS transistor, and a gate of the eighteenth NMOS transistor are connected, and a connecting terminal of the gate of the fifteenth NMOS transistor, the gate of the sixteenth NMOS transistor, the gate of the seventeenth NMOS transistor, and the gate of the eighteenth NMOS transistor is the second inverting input terminal of the AND gate. A gate of the twenty-first NMOS transistor is the evaluation control terminal of the AND gate, and a source of the twenty-first NMOS transistor is grounded. The first PMOS transistor, the second PMOS transistor, the third PMOS transistor, the fourth PMOS transistor, and the fifth PMOS transistor are common-threshold voltage PMOS transistors, the first NMOS transistor, the second NMOS transistor, the third NMOS transistor, the fourth NMOS transistor, and the twenty-first NMOS transistor are common-threshold voltage NMOS transistors, the sixth NMOS transistor, the seventh NMOS transistor, the eighth NMOS transistor, the twelfth NMOS transistor, the fourteenth NMOS transistor, the fifteenth NMOS transistor, the sixteenth NMOS transistor, and the twentieth NMOS transistor are low-threshold voltage NMOS transistors, and the fifth NMOS transistor, the ninth NMOS transistor, the tenth NMOS transistor, the eleventh NMOS transistor, the thirteenth NMOS transistor, the seventeenth NMOS transistor, the eighteenth NMOS transistor, and the nineteenth NMOS transistor are high-threshold voltage NMOS transistors. In this circuit, each AND gate based on the three-phase dual-track pre-charge logic has a pre-charge stage, an evaluation stage, and a discharge stage in each work cycle, is constant in energy consumption due to the fact that output terminals of an AND gate are discharged to a low level VSS from a supply voltage VDD in each work cycle, has a good capacity to defend power attacks due to mutual independence of the energy consumption and processed data, fulfills a AND logic function through the configuration of the threshold voltages of the NMOS transistors, and has a good capacity to defend reverse engineering attacks when encountering the reverse engineering attacks due to the fact that no correct logical function can be obtained from the layout.

The OR gate includes a sixth PMOS transistor, a seventh PMOS transistor, an eighth PMOS transistor, a ninth PMOS transistor, a tenth PMOS transistor, a twenty-second NMOS transistor, a twenty-third NMOS transistor, a twenty-fourth NMOS transistor, a twenty-fifth NMOS transistor, a twenty-sixth NMOS transistor, a twenty-seventh NMOS transistor, a twenty-eighth NMOS transistor, a twenty-ninth NMOS transistor, a thirtieth NMOS transistor, a thirty-first NMOS transistor, a thirty-second NMOS transistor, a thirty-third NMOS transistor, a thirty-fourth NMOS transistor, a thirty-fifth NMOS transistor, a thirty-sixth NMOS transistor, a thirty-seventh NMOS transistor, a thirty-eighth NMOS transistor, a thirty-ninth NMOS transistor, a fortieth NMOS transistor, a forty-first NMOS transistor, and a forty-second NMOS transistor, wherein a source of the sixth PMOS transistor is accessed to a power supply. A gate of the sixth PMOS transistor, a gate of the twenty-second NMOS transistor, and a gate of the twenty-fifth NMOS transistor are connected, and a connecting terminal of the gate of the sixth PMOS transistor, the gate of the twenty-second NMOS transistor, and the gate of the twenty-fifth NMOS transistor is the discharge control terminal of the OR gate. A drain of the sixth PMOS transistor, a source of the seventh PMOS transistor, a source of the eighth PMOS transistor, a source of the ninth PMOS transistor, and a source of the tenth PMOS transistor are connected. A gate of the seventh PMOS transistor is connected to a gate of the tenth PMOS transistor, and a connecting terminal of the gate of the seventh PMOS transistor and the gate of the tenth PMOS transistor is the pre-charge control terminal of the OR gate. A drain of the seventh PMOS transistor, a drain of the eighth PMOS transistor, a drain of the twenty-second NMOS transistor, a drain of the twenty-third NMOS transistor, a gate of the ninth PMOS transistor, and a gate of the twenty-fourth NMOS transistor are connected, and a connecting terminal of the drain of the seventh PMOS transistor, the drain of the eighth PMOS transistor, the drain of the twenty-second NMOS transistor, the drain of the twenty-third NMOS transistor, the gate of the ninth PMOS transistor, and the gate of the twenty-fourth NMOS transistor is the output terminal of the OR gate. A gate of the eighth PMOS transistor, a gate of the twenty-third NMOS transistor, a drain of the ninth PMOS transistor, a drain of the twenty-fourth NMOS transistor, a drain of the tenth PMOS transistor, and a drain of the twenty-fifth NMOS transistor are connected, and a connecting terminal of the gate of the eighth PMOS transistor, the gate of the twenty-third NMOS transistor, the drain of the ninth PMOS transistor, the drain of the twenty-fourth NMOS transistor, the drain of the tenth PMOS transistor, and the drain of the twenty-fifth NMOS transistor is the inverting output terminal of the OR gate. A source of the twenty-second NMOS transistor is grounded, a source of the twenty-third NMOS transistor, a drain of the twenty-sixth NMOS transistor, a drain of the twenty-seventh NMOS transistor, a drain of the twenty-eighth NMOS transistor, and a drain of the twenty-ninth NMOS transistor are connected, a source of the twenty-fourth NMOS transistor, a drain of the thirtieth NMOS transistor, a drain of the thirty-first NMOS transistor, a drain of the thirty-second NMOS transistor, and a drain of the thirty-third NMOS transistor are connected, and a source of the twenty-fifth NMOS transistor is grounded. A gate of the twenty-sixth NMOS transistor, a gate of the twenty-eighth NMOS transistor, a gate of the thirty-first NMOS transistor, and a gate of the thirty-third NMOS transistor are connected, and a connecting terminal of the gate of the twenty-sixth NMOS transistor, the gate of the twenty-eighth NMOS transistor, the gate of the thirty-first NMOS transistor, and the gate of the thirty-third NMOS transistor is the first input terminal of the OR gate. A source of the twenty-sixth NMOS transistor is connected to a drain of the thirty-fourth NMOS transistor. A gate of the twenty-seventh NMOS transistor, a gate of the twenty-ninth NMOS transistor, a gate of the thirtieth NMOS transistor, and a gate of the thirty-second NMOS transistor are connected, and a connecting terminal of the gate of the twenty-seventh NMOS transistor, the gate of the twenty-ninth NMOS transistor, the gate of the thirtieth NMOS transistor, and the gate of the thirty-second NMOS transistor is the first inverting input terminal of the OR gate. A source of the twenty-seventh NMOS transistor is connected to a drain of the thirty-fifth NMOS transistor, a source of the twenty-eighth NMOS transistor is connected to a drain of the thirty-sixth NMOS transistor, a source of the twenty-ninth NMOS transistor is connected to a drain of the thirty-seventh NMOS transistor, a source of the thirtieth NMOS transistor is connected to a drain of the thirty-eighth NMOS transistor, a source of the thirty-first NMOS transistor is connected to a drain of the thirty-ninth NMOS transistor, a source of the thirty-second NMOS transistor is connected to a drain of the fortieth NMOS transistor, and a source of the thirty-third NMOS transistor is connected to a drain of the forty-first NMOS transistor. A gate of the thirty-fourth NMOS transistor, a gate of the thirty-fifth NMOS transistor, a gate of the fortieth NMOS transistor, and a gate of the forty-first NMOS transistor are connected, and a connecting terminal of the gate of the thirty-fourth NMOS transistor, the gate of the thirty-fifth NMOS transistor, the gate of the fortieth NMOS transistor, and the gate of the forty-first NMOS transistor is the second input terminal of the OR gate. A source of the thirty-fourth NMOS transistor, a source of the thirty-fifth NMOS transistor, a source of the thirty-sixth NMOS transistor, a source of the thirty-seventh NMOS transistor, a source of the thirty-eighth NMOS transistor, a source of the thirty-ninth NMOS transistor, a source of the fortieth NMOS transistor, a source of the forty-first NMOS transistor, and a drain of the forty-second NMOS transistor are connected. A gate of the thirty-sixth NMOS transistor, a gate of the thirty-seventh NMOS transistor, a gate of the thirty-eighth NMOS transistor, and a gate of the thirty-ninth NMOS transistor are connected, and a connecting terminal of the gate of the thirty-sixth NMOS transistor, the gate of the thirty-seventh NMOS transistor, the gate of the thirty-eighth NMOS transistor, and the gate of the thirty-ninth NMOS transistor is the second inverting input terminal of the OR gate. A gate of the forty-second NMOS transistor is the evaluation control terminal of the OR gate, and a source of the forty-second NMOS transistor is grounded. The sixth PMOS transistor, the seventh PMOS transistor, the eighth PMOS transistor, the ninth PMOS transistor, and the tenth PMOS transistor are common-threshold voltage PMOS transistors, the twenty-second NMOS transistor, the twenty-third NMOS transistor, the twenty-fourth NMOS transistor, the twenty-fifth NMOS transistor, and the forty-second NMOS transistor are common-threshold voltage NMOS transistors, the twenty-ninth NMOS transistor, the thirty-first NMOS transistor, the thirty-second NMOS transistor, the thirty-third NMOS transistor, the thirty-seventh NMOS transistor, the thirty-ninth NMOS transistor, the fortieth NMOS transistor, and the forty-first NMOS transistor are low-threshold voltage NMOS transistors, and the twenty-sixth NMOS transistor, the twenty-seventh NMOS transistor, the twenty-eighth NMOS transistor, the thirtieth NMOS transistor, the thirty-fourth NMOS transistor, the thirty-fifth NMOS transistor, the thirty-sixth NMOS transistor, and the thirty-eighth NMOS transistor are high-threshold voltage NMOS transistors. In this circuit, the OR gate based on the three-phase dual-track pre-charge logic has a pre-charge stage, an evaluation stage, and a discharge stage in each work cycle, is constant in energy consumption due to the fact that output terminals of an OR gate are discharged to VSS from a supply voltage VDD in each work cycle, has a good capacity to defend power attacks due to mutual independence of the energy consumption and processed data, fulfills a OR logic function through the configuration of the threshold voltages of the NMOS transistors, and has a good capacity to defend reverse engineering attacks when encountering the reverse engineering attacks due to the fact that no correct logical function can be obtained from the layout.

The common-threshold voltage PMOS transistors have a threshold voltage of −0.404V, the common-threshold voltage NMOS transistors have a threshold voltage of 0.397V, the low-threshold voltage NMOS transistors have a threshold voltage of 0.243V, and the high-threshold voltage NMOS transistors have a threshold voltage of 0.489V.

Compared with the prior art, the invention has the following advantages: the data selector is composed of the two AND gates, the OR gate, and the three buffers, wherein two AND gates and the OR gate adopt the three-phase dual-track pre-charge logic as the work logic. The data selector fulfills one time of evaluation operation and has the pre-charge stage, the evaluation stage, and the discharge stage in one cycle. When the discharge control signal, the pre-charge control signal, and the evaluation control signal are at low levels, the data selector is in the pre-charge stage, and an output terminal and an inverting output terminal of the data selector are pre-charged to high levels. When the evaluation control signal and the pre-charge control signal are changed to high levels from the low levels, the pre-charge stage is finished, the data selector is in the evaluation stage, at this moment, if the selection signal is 0, the first input signal is output by the output terminal of the data selector, and if the selection signal is 1, the second input signal is output by the output terminal of the data selector. When the evaluation control signal turns to the low level from the high level and the discharge control signal is changed to a high level from the low level, the data selector is in a discharge state, the output terminal and the inverting output terminal of the data selector are discharged to the low levels, and one cycle is finished. From the above description, the data selector of the invention uses the AND gates and the OR gate which adopt the three-phase dual-track pre-charge logic as basic units, so that different logic functions can be achieved only through the configuration of the threshold voltages, and an output is discharged to a low level from a high pre-charge level in each work cycle, energy consumption is constant, both reverse engineering attacks and DPA attacks can be defended due to the mutual independence of the energy consumption and the processed data, and power consumption is low.

DETAILED DESCRIPTION OF THE INVENTION

The invention is further expounded as follows in combination with the accompanying drawings and embodiments.

Figure 1:
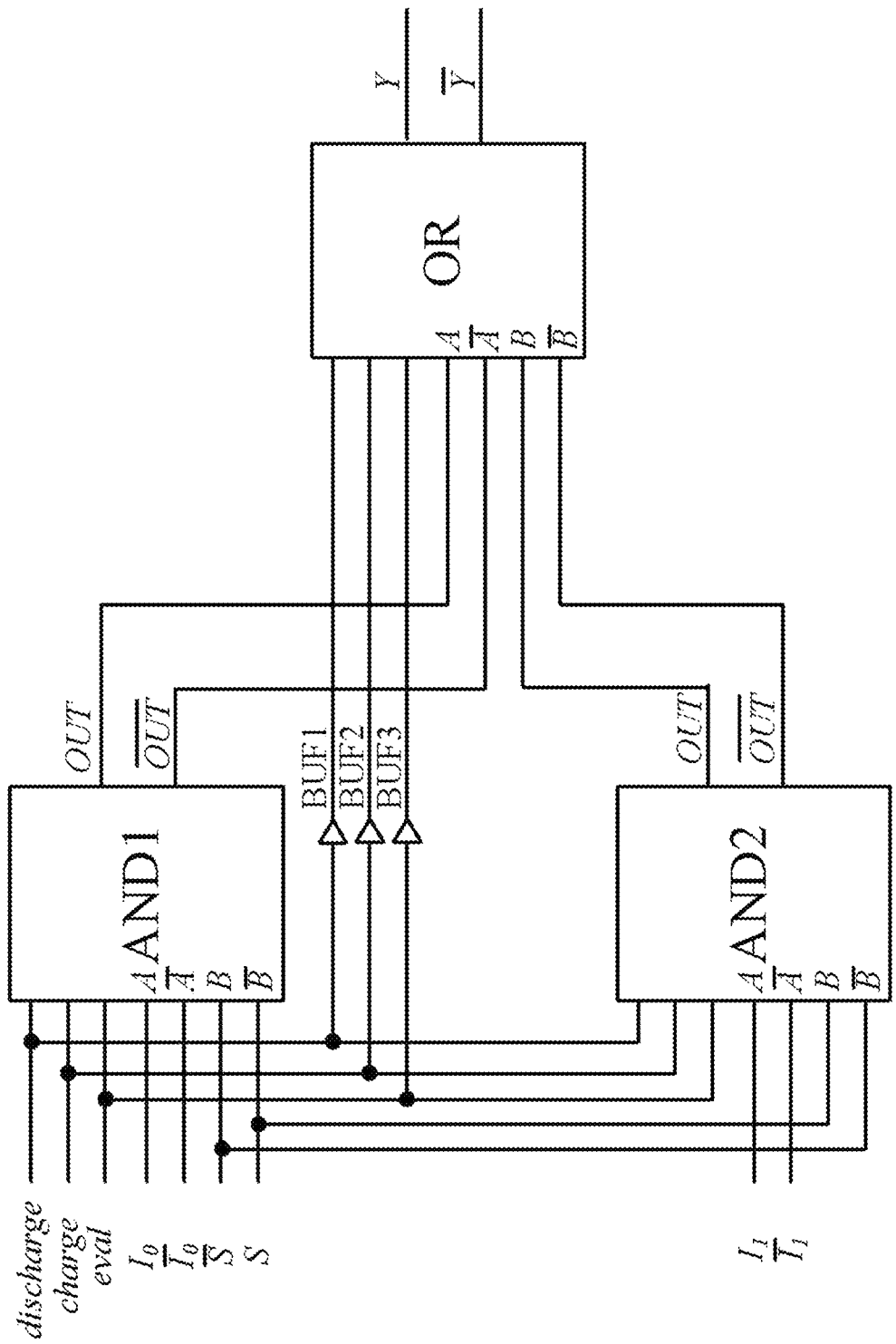
FIG. 1 is a circuit diagram of a data selector based on TVD of the invention.

Embodiment 1 as shown in FIG. 1, a data selector based on TVD includes two AND gates, an OR gate OR, and three buffers, wherein the two AND gates and the OR gate OR adopt a three-phase dual-track pre-charge logic as a work logic. The AND gates and the OR gate each have a pre-charge control terminal, a discharge control terminal, an evaluation control terminal, a first input terminal, a first inverting input terminal, a second input terminal, a second inverting input terminal, an output terminal, and an inverting output terminal. The two AND gates are respectively referred to as a first AND gate AND1 and a second AND gate AND2, and the three buffers are respectively referred to as a first buffer BUF1, a second buffer BUF2, and a third buffer BUF3. The discharge control terminal of the first AND gate AND1, the discharge control terminal of the second AND gate AND2, and the input terminal of the first buffer BUF1 are connected, and a connecting terminal is a discharge control terminal of the data selector and allows a discharge control signal discharge to be accessed therein. The pre-charge control terminal of the first AND gate AND1, the pre-charge control terminal of the second AND gate AND2, and the input terminal of the second buffer BUF2 are connected, and a connecting terminal is a pre-charge control terminal of the data selector and allows a pre-charge control signal charge to be accessed therein. The evaluation control terminal of the first AND gate AND1, the evaluation control terminal of the second AND gate AND2, and the input terminal of the third buffer BUF3 are connected, and a connecting terminal is an evaluation control terminal of the data selector and allows an evaluation control signal eval to be accessed therein. The output terminal of the first buffer BUF1 is connected to the discharge control terminal of the OR gate OR, the output terminal of the second buffer BUF2 is connected to the pre-charge control terminal of the OR gate OR, and the output terminal of the third buffer BUF3 is connected to the evaluation control terminal of the OR gate OR. The first input terminal of the first AND gate AND1 is a first input terminal of the data selector and allows a first input signal $I_0$ to be accessed therein, the first inverting input terminal of the first AND gate AND1 is a first inverting input terminal of the data selector and allows an inversion signal $\overline{I_0}$ of the first input signal $I_0$ to be accessed therein, the first input terminal of the second AND gate AND2 is a second input terminal of the data selector and allows a second input signal $I_1$ to be accessed therein, and the first inverting input terminal of the second AND gate AND2 is a second inverting input terminal of the data selector and allows an inversion signal $\overline{I_1}$ of the second input signal $I_1$ to be accessed therein. The second inverting input terminal of the first AND gate AND1 is connected to the second input terminal of the second AND gate AND2, and a connecting terminal is a selection terminal of the data selector and allows a selection signal S to be accessed therein. The second input terminal of the first AND gate AND1 is connected to the second inverting input terminal of the second AND gate AND2, and a connecting terminal is an inverting selection terminal of the data selector and allows an inversion signal $\overline{S}$ of the selection signal S to be accessed therein. The output terminal of the first AND gate AND1 is connected to the first input terminal of the OR gate OR, the inverting output terminal of the first AND gate AND1 is connected to the first inverting input terminal of the OR gate OR, the output terminal of the second AND gate AND2 is connected to the second input terminal of the OR gate OR, and the inverting output terminal of the second AND gate AND2 is connected to the second inverting input terminal of the OR gate OR. The output terminal of the OR gate OR is an output terminal of the selector and is used for outputting an output signal Y, and the inverting output terminal of the OR gate OR is an inverting output terminal of the selector and is used for outputting an inversion signal $\overline{Y}$ of the output signal Y.

Embodiment 2

Figure 2:
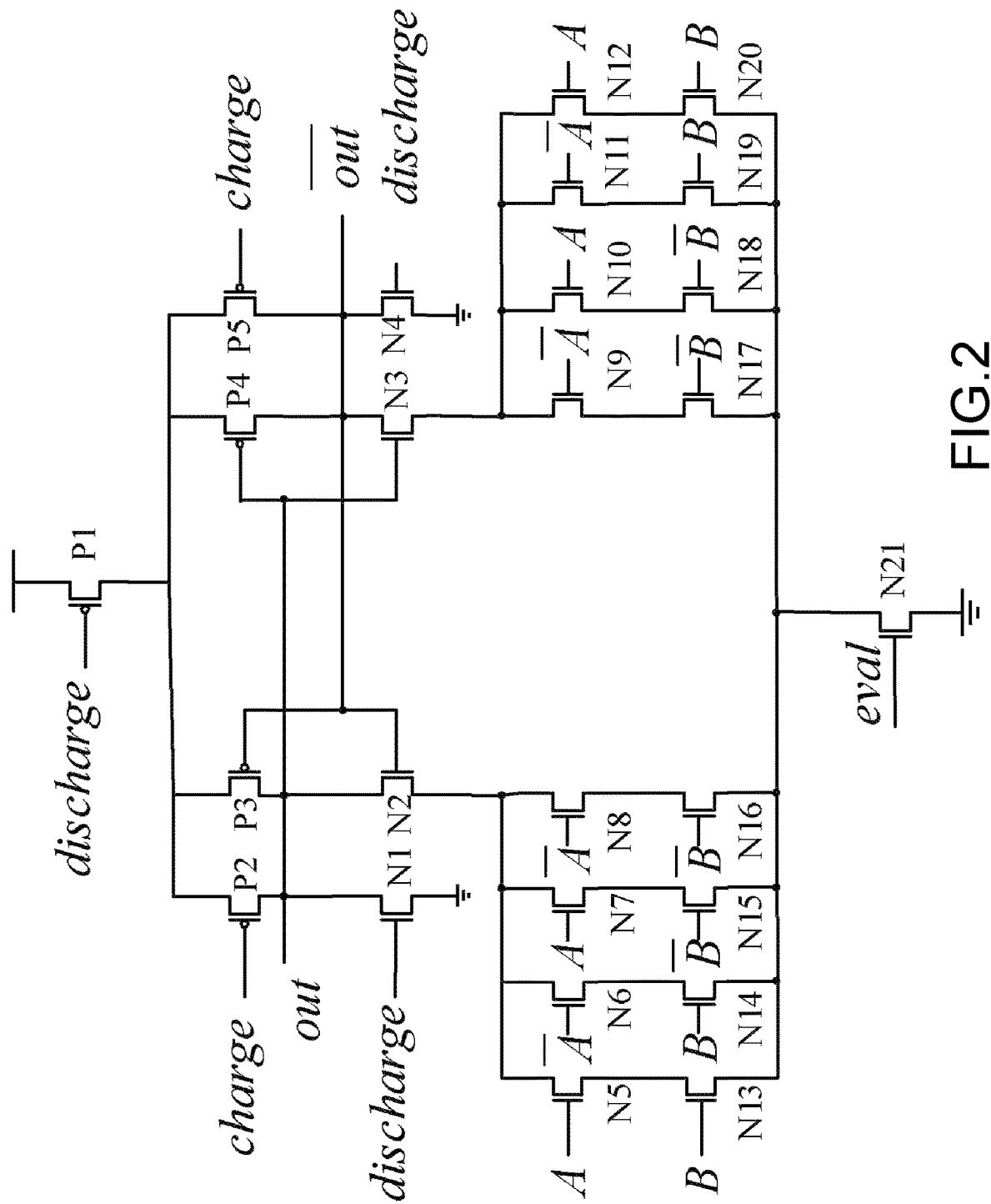
FIG. 2 is a circuit diagram of an AND gate of the data selector based on TVD of the invention.

Embodiment 2 is basically the same as Embodiment 1 and differs from Embodiment 1 as follows:

As shown in FIG. 2, in this embodiment, each AND gate includes a first PMOS transistor P1, a second PMOS transistor P2, a third PMOS transistor P3, a fourth PMOS transistor P4, a fifth PMOS transistor P5, a first NMOS transistor N1, a second NMOS transistor N2, a third NMOS transistor N3, a fourth NMOS transistor N4, a fifth NMOS transistor N5, a sixth NMOS transistor N6, a seventh NMOS transistor N7, an eighth NMOS transistor N8, a ninth NMOS transistor N9, a tenth NMOS transistor N10, an eleventh NMOS transistor N11, a twelfth NMOS transistor N12, a thirteenth NMOS transistor N13, a fourteenth NMOS transistor N14, a fifteenth NMOS transistor N15, a sixteenth NMOS transistor N16, a seventeenth NMOS transistor N17, an eighteenth NMOS transistor N18, a nineteenth NMOS transistor N19, a twentieth NMOS transistor N20, and a twenty-first NMOS transistor N21, wherein a source of the first PMOS transistor P1 is accessed to a power supply VDD. A gate of the first PMOS transistor P1, a gate of the first NMOS transistor N1, and a gate of the fourth NMOS transistor N4 are connected, and a connecting terminal is the discharge control terminal of the AND gate. A drain of the first PMOS transistor P1, a source of the second PMOS transistor P2, a source of the third PMOS transistor P3, a source of the fourth PMOS transistor P4, and a source of the fifth PMOS transistor P5 are connected. A gate of the second PMOS transistor P2 is connected to a gate of the fifth PMOS transistor P5, and a connecting terminal is the pre-charge control terminal of the AND gate. A drain of the second PMOS transistor P2, a drain of the third PMOS transistor P3, a drain of the first NMOS transistor N1, a drain of the second NMOS transistor N2, a gate of the fourth PMOS transistor P4, and a gate of the third NMOS transistor N3 are connected, and a connecting terminal is the output terminal of the AND gate. A gate of the third PMOS transistor P3, a gate of the second NMOS transistor N2, a drain of the fourth PMOS transistor P4, a drain of the third NMOS transistor N3, a drain of the fifth PMOS transistor P5, and a drain of the fourth NMOS transistor N4 are connected, and a connecting terminal is the inverting output terminal of the AND gate. A source of the first NMOS transistor N1 is grounded VSS, a source of the second NMOS transistor N2, a drain of the fifth NMOS transistor N5, a drain of the sixth NMOS transistor N6, a drain of the seventh NMOS transistor N7, and a drain of the eighth NMOS transistor N8 are connected, a source of the third NMOS transistor N3, a drain of the ninth NMOS transistor N9, a drain of the tenth NMOS transistor N10, a drain of the eleventh NMOS transistor N11, and a drain of the twelfth NMOS transistor N12 are connected, and a source of the fourth NMOS transistor N14 is grounded VSS. A gate of the fifth NMOS transistor N5, a gate of the seventh NMOS transistor N7, a gate of the tenth NMOS transistor N10, and a gate of the twelfth NMOS transistor N12 are connected, and a connecting terminal is the first input terminal of the AND gate. A source of the fifth NMOS transistor N5 is connected to a drain of the thirteenth NMOS transistor N13. A gate of the sixth NMOS transistor N6, a gate of the eighth NMOS transistor N8, a gate of the ninth NMOS transistor N9, and a gate of the eleventh NMOS transistor N11 are connected, and a connecting terminal is the first inverting input terminal of the AND gate. A source of the sixth NMOS transistor N6 is connected to a drain of the fourteenth NMOS transistor N14, a source of the seventh NMOS transistor N7 is connected to a drain of the fifteenth NMOS transistor N15, a source of the eighth NMOS transistor N8 is connected to a drain of the sixteenth NMOS transistor N16, a source of the ninth NMOS transistor N9 is connected to a drain of the seventeenth NMOS transistor N17, a source of the tenth NMOS transistor N10 is connected to a drain of the eighteenth NMOS transistor N18, a source of the eleventh NMOS transistor N11 is connected to a drain of the nineteenth NMOS transistor N19, and a source of the twelfth NMOS transistor N12 is connected to a drain of the twentieth NMOS transistor N20. A gate of the thirteenth NMOS transistor N13, a gate of the thirteenth NMOS transistor, a gate of the fourteenth NMOS transistor N14, a gate of the nineteenth NMOS transistor N19, and a gate of the twentieth NMOS transistor N20 are connected, and a connecting terminal is the second input terminal of the AND gate. A source of the thirteenth NMOS transistor N13, a source of the fourteenth NMOS transistor N14, a source of the fifteenth NMOS transistor N15, a source of the sixteenth NMOS transistor N16, a source of the seventeenth NMOS transistor N17, a source of the eighteenth NMOS transistor N18, a source of the nineteenth NMOS transistor N19, a source of the twentieth NMOS transistor N20, and a drain of the twenty-first NMOS transistor N21 are connected. A gate of the fifteenth NMOS transistor N15, a gate of the sixteenth NMOS transistor N16, a gate of the seventeenth NMOS transistor N17, and a gate of the eighteenth NMOS transistor N18 are connected, and a connecting terminal is the second inverting input terminal of the AND gate. A gate of the twenty-first NMOS transistor N21 is the evaluation control terminal of the AND gate, and a source of the twenty-first NMOS transistor N21 is grounded VSS. The first PMOS transistor P1, the second PMOS transistor P2, the third PMOS transistor P3, the fourth PMOS transistor P4, and the fifth PMOS transistor P5 are common-threshold voltage PMOS transistors, the first NMOS transistor N1, the second NMOS transistor N2, the third NMOS transistor N3, the fourth NMOS transistor N4, and the twenty-first NMOS transistor N21 are common-threshold voltage NMOS transistors, the sixth NMOS transistor N6, the seventh NMOS transistor N7, the eighth NMOS transistor N8, the twelfth NMOS transistor N12, the fourteenth NMOS transistor N14, the fifteenth NMOS transistor N15, the sixteenth NMOS transistor N16, and the twentieth NMOS transistor N20 are low-threshold voltage NMOS transistors, and the fifth NMOS transistor N5, the ninth NMOS transistor N9, the tenth NMOS transistor N10, the eleventh NMOS transistor N11, the thirteenth NMOS transistor N13, the seventeenth NMOS transistor N17, the eighteenth NMOS transistor N18, and the nineteenth NMOS transistor N19 are high-threshold voltage NMOS transistors.

Figure 3:
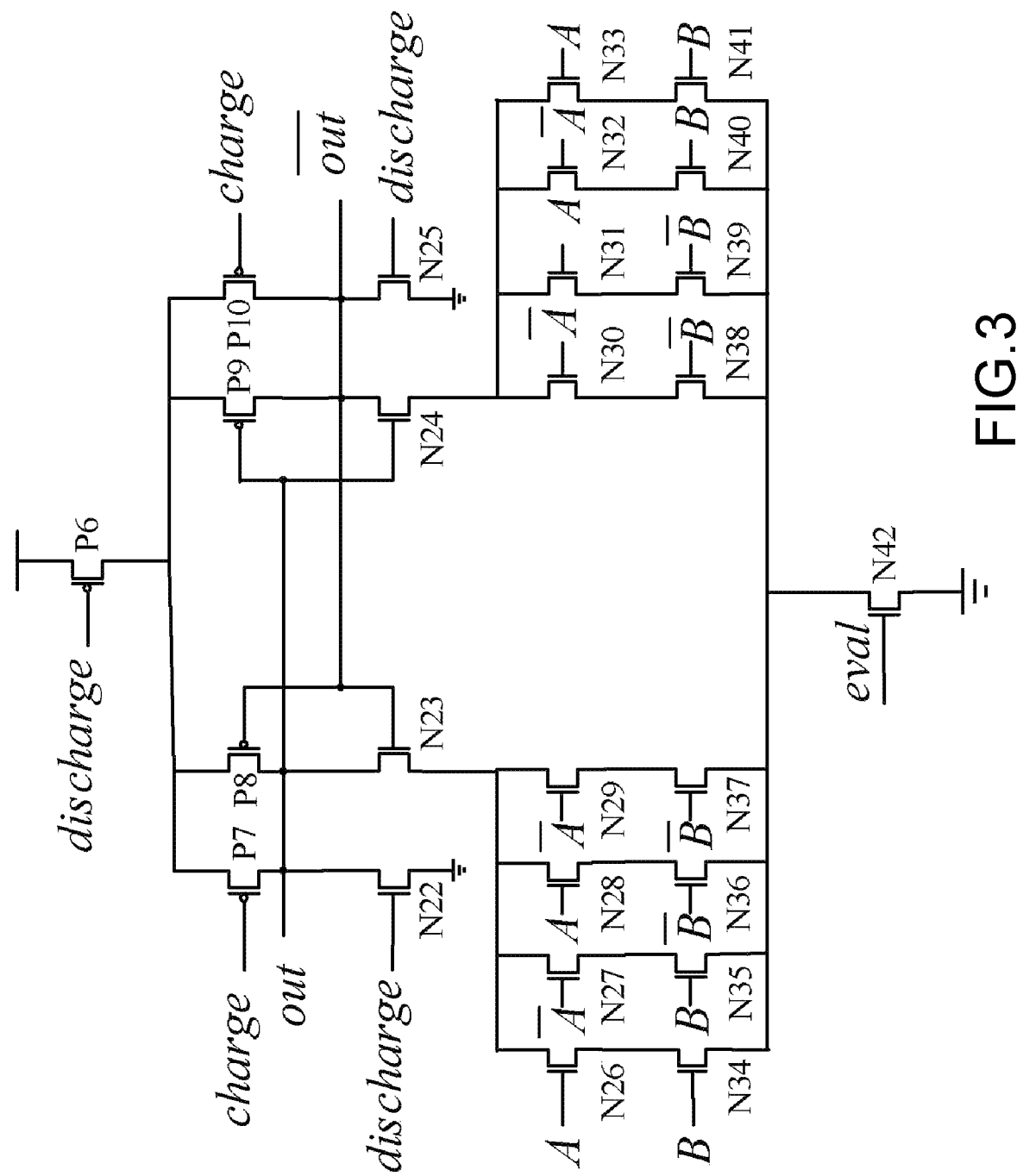
FIG. 3 is a circuit diagram of an OR gate of the data selector based on TVD of the invention.

As shown in FIG. 3, in this embodiment, the OR gate includes a sixth PMOS transistor P6, a seventh PMOS transistor P7, an eighth PMOS transistor P8, a ninth PMOS transistor P9, a tenth PMOS transistor P10, a twenty-second NMOS transistor N22, a twenty-third NMOS transistor N23, a twenty-fourth NMOS transistor N24, a twenty-fifth NMOS transistor N25, a twenty-sixth NMOS transistor N26, a twenty-seventh NMOS transistor N27, a twenty-eighth NMOS transistor N28, a twenty-ninth NMOS transistor N29, a thirtieth NMOS transistor N30, a thirty-first NMOS transistor N31, a thirty-second NMOS transistor N32, a thirty-third NMOS transistor N33, a thirty-fourth NMOS transistor N34, a thirty-fifth NMOS transistor N35, a thirty-sixth NMOS transistor N36, a thirty-seventh NMOS transistor N37, a thirty-eighth NMOS transistor N38, a thirty-ninth NMOS transistor N39, a fortieth NMOS transistor N40, a forty-first NMOS transistor N41, and a forty-second NMOS transistor N42, wherein a source of the sixth PMOS transistor P6 is accessed to a power supply VDD. A gate of the sixth PMOS transistor P6, a gate of the twenty-second NMOS transistor N22, and a gate of the twenty-fifth NMOS transistor N25 are connected, and a connecting terminal is the discharge control terminal of the OR gate. A drain of the sixth PMOS transistor P6, a source of the seventh PMOS transistor P7, a source of the eighth PMOS transistor P8, a source of the ninth PMOS transistor P9, and a source of the tenth PMOS transistor P10 are connected. A gate of the seventh PMOS transistor P7 is connected to a gate of the tenth PMOS transistor P10, and a connecting terminal is the pre-charge control terminal of the OR gate. A drain of the seventh PMOS transistor P7, a drain of the eighth PMOS transistor P8, a drain of the twenty-second NMOS transistor N22, a drain of the twenty-third NMOS transistor N23, a gate of the ninth PMOS transistor P9, and a gate of the twenty-fourth NMOS transistor N24 are connected, and a connecting terminal is the output terminal of the OR gate. A gate of the eighth PMOS transistor P8, a gate of the twenty-third NMOS transistor N23, a drain of the ninth PMOS transistor P9, a drain of the twenty-fourth NMOS transistor N24, a drain of the tenth PMOS transistor P10, and a drain of the twenty-fifth NMOS transistor N25 are connected, and a connecting terminal is the inverting output terminal of the OR gate. A source of the twenty-second NMOS transistor N22 is grounded VSS, a source of the twenty-third NMOS transistor N23, a drain of the twenty-sixth NMOS transistor N26, a drain of the twenty-seventh NMOS transistor N27, a drain of the twenty-eighth NMOS transistor N28, and a drain of the twenty-ninth NMOS transistor N29 are connected, a source of the twenty-fourth NMOS transistor N24, a drain of the thirtieth NMOS transistor N30, a drain of the thirty-first NMOS transistor N31, a drain of the thirty-second NMOS transistor N32, and a drain of the thirty-third NMOS transistor N33 are connected, a source of the twenty-fifth NMOS transistor N25 is grounded VSS. A gate of the twenty-sixth NMOS transistor N26, a gate of the twenty-eighth NMOS transistor N28, a gate of the thirty-first NMOS transistor N31, and a gate of the thirty-third NMOS transistor N33 are connected, and a connecting terminal is the first input terminal of the OR gate. A source of the twenty-sixth NMOS transistor N26 is connected to a drain of the thirty-fourth NMOS transistor N34. A gate of the twenty-seventh NMOS transistor N27, a gate of the twenty-ninth NMOS transistor N29, a gate of the thirtieth NMOS transistor N30, and a gate of the thirty-second NMOS transistor N32 are connected, and a connecting terminal is the first inverting input terminal of the OR gate. A source of the twenty-seventh NMOS transistor N27 is connected to a drain of the thirty-fifth NMOS transistor N35, a source of the twenty-eighth NMOS transistor N28 is connected to a drain of the thirty-sixth NMOS transistor N36, a source of the twenty-ninth NMOS transistor N29 is connected to a drain of the thirty-seventh NMOS transistor N37, a source of the thirtieth NMOS transistor N30 is connected to a drain of the thirty-eighth NMOS transistor N38, a source of the thirty-first NMOS transistor N31 is connected to a drain of the thirty-ninth NMOS transistor N39, a source of the thirty-second NMOS transistor N32 is connected to a drain of the fortieth NMOS transistor N40, and a source of the thirty-third NMOS transistor N33 is connected to a drain of the forty-first NMOS transistor N41. A gate of the thirty-fourth NMOS transistor N34, a gate of the thirty-fifth NMOS transistor N35, a gate of the fortieth NMOS transistor N40, and a gate of the forty-first NMOS transistor N41 are connected, and a connecting terminal is the second input terminal of the OR gate. A source of the thirty-fourth NMOS transistor N34, a source of the thirty-fifth NMOS transistor N35, a source of the thirty-sixth NMOS transistor N36, a source of the thirty-seventh NMOS transistor N37, a source of the thirty-eighth NMOS transistor N38, a source of the thirty-ninth NMOS transistor N39, a source of the fortieth NMOS transistor N40, a source of the forty-first NMOS transistor N41, and a drain of the forty-second NMOS transistor N42 are connected. A gate of the thirty-sixth NMOS transistor N36, a gate of the thirty-seventh NMOS transistor N37, a gate of the thirty-eighth NMOS transistor N38, and a gate of the thirty-ninth NMOS transistor N39 are connected, and a connecting terminal is the second inverting input terminal of the OR gate. A gate of the forty-second NMOS transistor N42 is the evaluation control terminal of the OR gate, and a source of the forty-second NMOS transistor N42 is grounded VSS. The sixth PMOS transistor P6, the seventh PMOS transistor P7, the eighth PMOS transistor P8, the ninth PMOS transistor P9, and the tenth PMOS transistor P10 are common-threshold voltage PMOS transistors, the twenty-second NMOS transistor N22, the twenty-third NMOS transistor N23, the twenty-fourth NMOS transistor N24, the twenty-fifth NMOS transistor N25, and the forty-second NMOS transistor N42 are common-threshold voltage NMOS transistors, the twenty-ninth NMOS transistor N29, the thirty-first NMOS transistor N31, the thirty-second NMOS transistor N32, the thirty-third NMOS transistor N33, the thirty-seventh NMOS transistor N37, the thirty-ninth NMOS transistor N39, the fortieth NMOS transistor N40, and the forty-first NMOS transistor N41 are low-threshold voltage NMOS transistors, and the twenty-sixth NMOS transistor N26, the twenty-seventh NMOS transistor N27, the twenty-eighth NMOS transistor N28, the thirtieth NMOS transistor N30, the thirty-fourth NMOS transistor N34, the thirty-fifth NMOS transistor N35, the thirty-sixth NMOS transistor N36, and the thirty-eighth NMOS transistor N38 are high-threshold voltage NMOS transistors.

In this embodiment, the common-threshold voltage PMOS transistors have a threshold voltage of −0.404V, the common-threshold voltage NMOS transistors have a threshold voltage of 0.397V, the low-threshold voltage NMOS transistors have a threshold voltage of 0.243V, and the high-threshold voltage NMOS transistors have a threshold voltage of 0.489V.

The working process of each AND gate of the data selector based on TVD of the invention is as follows: when the pre-charge control signal charge, the discharge control signal discharge, and the evaluation control signal eval are at low levels, a circuit enters a pre-charge stage, the first PMOS transistor P1, the second PMOS transistor P2, and the fifth PMOS transistor P5 are turned on, the output terminal out and the inverting output terminal $\overline{out}$ of the AND gate are pre-charged to a supply voltage VDD. The evaluation control signal eval and the pre-charge control signal charge are changed to high levels, the second PMOS transistor P2 and the fifth PMOS transistor P5 are turned off at the same time, the pre-charge stage of the circuit is finished, the twenty-first NMOS transistor N21 serving as an evaluation transistor is turned on, and the circuit enters an evaluation stage. If a first input signal A meets A=0 and a second input signal B meets B=0 at this time, the eighth NMOS transistor N8, the ninth NMOS transistor N9, the sixteenth NMOS transistor N16, and the seventeenth NMOS transistor N17 in a pull-down network are turned on, and the second NMOS transistor N2 and the third NMOS transistor N3 are pre-charged to high levels VDD before reaching gate voltages, so that currents flow across the second NMOS transistor N2 and the third NMOS transistor N3. Because the eighth NMOS transistor N8 and the sixteenth NMOS transistor N16 are low-threshold transistors, a sensitive amplifier composed of the third PMOS transistor P3, the second NMOS transistor N2, the fourth PMOS transistor P4, and the third NMOS transistor N3 amplifies the current difference between the second NMOS transistor N2 and the third NMOS transistor N3, the output terminal out of the AND gate is discharged to a low level first, the fourth PMOS transistor P4 is turned on, and the inverting output terminal $\overline{out}$ of the AND gate is still kept at a high level. If the first input signal A meets A=0 and the second input signal B meets B=1 at this time, the sixth NMOS transistor N6, the eleventh NMOS transistor N11, the fourteenth NMOS transistor N14, and the nineteenth NMOS transistor N19 in the pull-down network are turned on, the second NMOS transistor N2 and the third NMOS transistor N3 are pre-charged to the high levels before reaching the gate voltages, so that the currents flow across the second NMOS transistor N2 and the third NMOS transistor N3. Because the sixth NMOS transistor N6 and the fourteenth NMOS transistor N14 are low-threshold transistors, the sensitive amplifier composed of the third PMOS transistor P3, the second NMOS transistor N2, the fourth PMOS transistor P4, and the third NMOS transistor N3 amplifies the current difference between the second NMOS transistor N2 and the third NMOS transistor N3, the output terminal out of the AND gate is discharged to the low level first, the fourth PMOS transistor P4 is turned on, and the inverting output terminal $\overline{out}$ of the AND gate is still kept at the high level. If the first input signal A meets A=1 and the second input signal B meets B=0 at this time, the seventh NMOS transistor N7, the tenth NMOS transistor N10, the fifteenth NMOS transistor N15, and the eighteenth NMOS transistor N18 in the pull-down network are turned on, the second NMOS transistor N2 and the third NMOS transistor N3 are pre-charged to the high levels before reaching the gate voltages, so that the currents flow across the second NMOS transistor N2 and the third NMOS transistor N3. Because the seventh NMOS transistor N7 and the fifteenth NMOS transistor N15 are low-threshold transistors, the sensitive amplifier composed of the third PMOS transistor P3, the second NMOS transistor N2, the fourth PMOS transistor P4, and the third NMOS transistor N3 amplifies the current difference between the second NMOS transistor N2 and the third NMOS transistor N3, the output terminal out of the AND gate is discharged to the low level first, the fourth PMOS transistor P4 is turned on, and the inverting output terminal $\overline{out}$ of the AND gate is still kept at the high level. If the first input signal A meets A=1 and the second input signal B meets B=1 at this time, the fifth NMOS transistor N5, the twelfth NMOS transistor N12, the thirteenth NMOS transistor N13, and the twentieth NMOS transistor N20 in the pull-down network are turned on, the second NMOS transistor N2 and the third NMOS transistor N3 are pre-charged to the high levels before reaching the gate voltages, so that the currents flow across the second NMOS transistor N2 and the third NMOS transistor N3. Because the twentieth NMOS transistor N12 and the twentieth NMOS transistor N20 are low-threshold transistors, the sensitive amplifier composed of the third PMOS transistor P3, the second NMOS transistor N2, the fourth PMOS transistor P4, and the third NMOS transistor N3 amplifies the current difference between the second NMOS transistor N2 and the third NMOS transistor N3, the inverting output terminal $\overline{out}$ of the AND gate is discharged to the low level first, the third PMOS transistor P3 is turned on, and the output terminal out of the AND gate is still kept at the high level. When the evaluation control signal eval is at the low level and the discharge control signal discharge is changed to a high level, the twenty-first NMOS transistor N21 is turned off, the evaluation is finished, the first NMOS transistor N1 and the fourth NMOS transistor N4 are turned on, the circuit enters a discharge stage, the output terminal out and the inverting output terminal $\overline{out}$ of the AND gate are discharged to the low levels, one work cycle is finished, and an AND logic function is fulfilled.

The working process of the OR gate of the data selector based on TVD of the invention is as follows: when the pre-charge control signal charge, the discharge control signal discharge, and the evaluation control signal eval are at low levels, a circuit enters a pre-charge stage, the sixth PMOS transistor P6, the seventh PMOS transistor P7, and the tenth PMOS transistor P10 are turned on, the output terminal out and the inverting output terminal $\overline{out}$ of the OR gate are pre-charged to a supply voltage VDD. The evaluation control signal eval and the pre-charge control signal charge are changed to high levels, the seventh PMOS transistor P7 and the tenth PMOS transistor P10 are turned off at the same time, the pre-charge stage of the circuit is finished, the forty-second NMOS transistor N42 serving as an evaluation transistor is turned on, and the circuit enters an evaluation stage. If a first input signal A meets A=0 and a second input signal B meets B=0 at this time, the twenty-ninth NMOS transistor N29, the thirtieth NMOS transistor N30, the thirty-seventh NMOS transistor N37, and the thirty-eighth NMOS transistor N38 in a pull-down network are turned on, and the twenty-third NMOS transistor N23 and the twenty-fourth NMOS transistor N24 are pre-charged to high levels before reaching gate voltages, so that currents flow across the twenty-third NMOS transistor N23 and the twenty-fourth NMOS transistor N24. Because the twenty-ninth NMOS transistor N29 and the thirty-seventh NMOS transistor N37 are low-threshold transistors, a sensitive amplifier composed of the eighth PMOS transistor P8, the twenty-third NMOS transistor N23, the ninth PMOS transistor P9, and the twenty-fourth NMOS transistor N24 amplifies the current difference between the twenty-third NMOS transistor N23 and the twenty-fourth NMOS transistor N24, the output terminal out of the OR gate is discharged to a low level first, the ninth PMOS transistor P9 is turned on, and the inverting output terminal $\overline{out}$ of the OR gate is still kept at a high level. If the first input signal A meets A=0 and the second input signal B meets B=1 at this time, the twenty-seventh NMOS transistor N27, the thirty-second NMOS transistor N32, the thirty-fifth NMOS transistor N35, and the fortieth NMOS transistor N40 in the pull-down network are turned on, and the twenty-third NMOS transistor N23 and the twenty-fourth NMOS transistor N24 are pre-charged to the high levels before reaching the gate voltages, so that the currents flow across the twenty-third NMOS transistor N23 and the twenty-fourth NMOS transistor N24. Because the thirty-second NMOS transistor N32 and the fortieth NMOS transistor N40 are low-threshold transistors, the sensitive amplifier composed of the eighth PMOS transistor P8, the twenty-third NMOS transistor N23, the ninth PMOS transistor P9, and the twenty-fourth NMOS transistor N24 amplifies the current difference between the twenty-third NMOS transistor N23 and the twenty-fourth NMOS transistor N24, the inverting output terminal $\overline{out}$ of the OR gate is discharged to the low level first, the eighth PMOS transistor P8 is turned on, and the output terminal out of the OR gate is still kept at the high level. If the first input signal A meets A=1 and the second input signal B meets B=0 at this time, the twenty-eighth NMOS transistor N28, the thirty-first NMOS transistor N31, the thirty-sixth NMOS transistor N36, and the thirty-ninth NMOS transistor N39 in the pull-down network are turned on, and the twenty-third NMOS transistor N23 and the twenty-fourth NMOS transistor N24 are pre-charged to the high levels before reaching the gate voltages, so that the currents flow across the twenty-third NMOS transistor N23 and the twenty-fourth NMOS transistor N24. Because the thirty-first NMOS transistor N31 and the thirty-ninth NMOS transistor N39 are low-threshold transistors, the sensitive amplifier composed of the eighth PMOS transistor P8, the twenty-third NMOS transistor N23, the ninth PMOS transistor P9, and the twenty-fourth NMOS transistor N24 amplifies the current difference between the twenty-third NMOS transistor N23 and the twenty-fourth NMOS transistor N24, the inverting output terminal $\overline{out}$ of the OR gate is discharged to the low level first, the eighth PMOS transistor P8 is turned on, and the output terminal out of the OR gate is still kept at the high level. If the first input signal A meets A=1 and the second input signal B meets B=1 at this time, the twenty-sixth NMOS transistor N26, the thirty-third NMOS transistor N33, the thirty-fourth NMOS transistor N34, and the forty-first NMOS transistor N41 in the pull-down network are turned on, and the twenty-third NMOS transistor N23 and the twenty-fourth NMOS transistor N24 are pre-charged to the high levels before reaching the gate voltages, so that the currents flow across the twenty-third NMOS transistor N23 and the twenty-fourth NMOS transistor N24. Because the thirty-third NMOS transistor N33 and the forty-first NMOS transistor N41 are low-threshold transistors, the sensitive amplifier composed of the eighth PMOS transistor P8, the twenty-third NMOS transistor N23, the ninth PMOS transistor P9, and the twenty-fourth NMOS transistor N24 amplifies the current difference between the twenty-third NMOS transistor N23 and the twenty-fourth NMOS transistor N24, the inverting output terminal $\overline{out}$ of the OR gate is discharged to the low level first, the eighth PMOS transistor P8 is turned on, and the output terminal out of the OR gate is still kept at the high level. When the evaluation control signal eval is at the low level and the discharge control signal discharge is changed to a high level, the forty-second MOS transistor N42 is turned off, the evaluation stage is finished, the twenty-second NMOS transistor N22 and the twenty-fifth NMOS transistor N25 are turned on, the circuit enters a discharge stage, the output terminal out and the inverting output terminal $\overline{out}$ of the OR gate are discharged to the low levels, one work cycle is finished, and an OR logic function is fulfilled.

The working process of the data selector based on TVD of the invention is as follows: the data selector has the pre-charge stage, the evaluation stage, and the discharge stage in each cycle. when the pre-charge control signal charge, the discharge control signal discharge, and the evaluation control signal eval are at the low levels, the data selector enters the pre-charge stage, and the output terminal and the inverting output terminal of the data selector are pre-charged to the high levels. When the evaluation control signal eval and the pre-charge control signal charge are changed to the high levels from the low levels, the pre-charge stage is finished, the data selector enters the evaluation stage, if the selection signal S is 0 at this time, the first input signal $I_0$ is output by the output terminal of the data selector, and if the selection signal S is 1, the second input terminal $I_1$ is output by the output terminal of the data selector. When the evaluation control signal eval is changed to the low level from the high level and the discharge control signal discharge is changed to the high level from the low level, the data selector enters the discharge state, the output terminal and the inverting output terminal of the data selector are discharged to the low levels, and one work cycle is finished.

Figure 4:
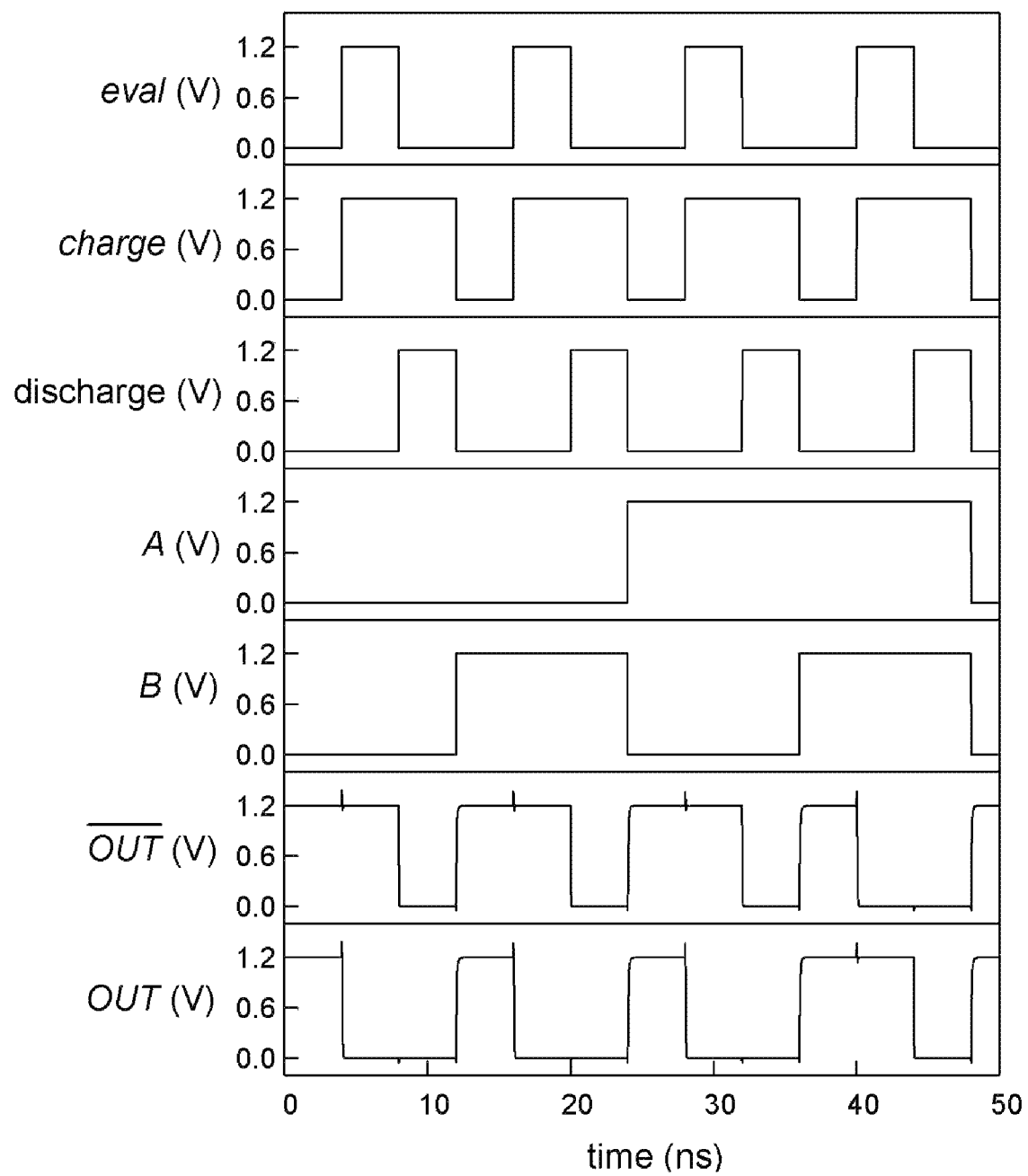
FIG. 4 is a simulated diagram of the AND gate of the data selector based on TVD of the invention.
Figure 5:
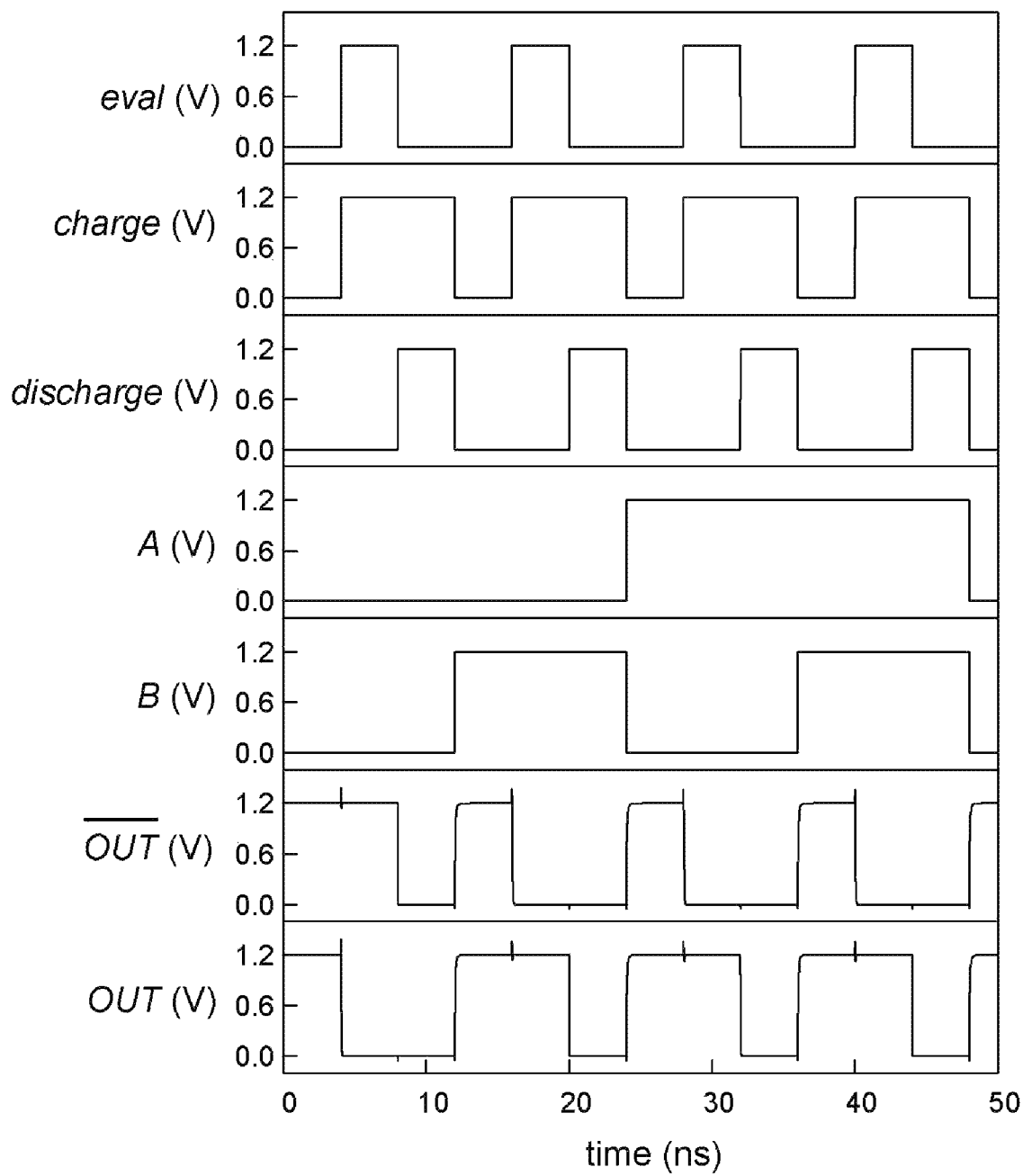
FIG. 5 is a simulated diagram of the OR gate of the data selector based on TVD of the invention.
Figure 6:
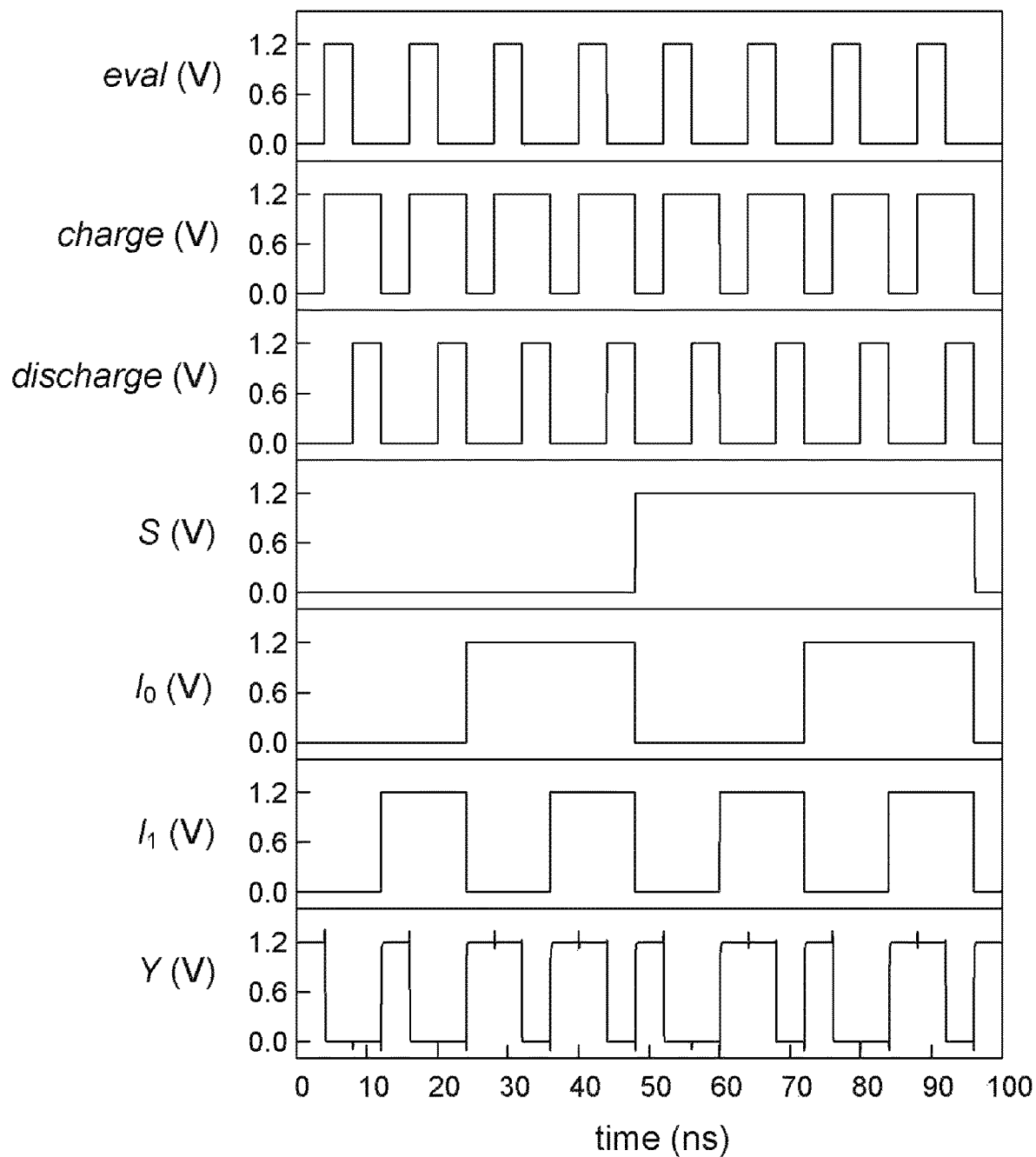
FIG. 6 is a simulated diagram of the data selector based on TVD of the invention.

FIG. 4 shows a simulated diagram of the AND gate of the data selector based on TVD of the invention, and it can be known, by analyzing FIG. 4, that the AND gate has a correct work logic. FIG. 5 shows a simulated diagram of the OR gate of the data selector based on TVD of the invention, and it can be known, by analyzing FIG. 5, that the OR gate has a correct work logic. FIG. 6 shows a simulated diagram of the data selector based on TVD of the invention, and it can be known, by analyzing FIG. 6, that the data selector has a correct work logic.

What is claimed is:

1. A data selector based on threshold voltage defined (TVD), comprising:
   two AND gates;
   an OR gate;
   and three buffers;
   wherein the two AND gates and the OR gate adopt a three-phase dual-track pre-charge logic as a work logic,
   the AND gates and the OR gate each have a pre-charge control terminal, a discharge control terminal, an evaluation control terminal, a first input terminal, a first inverting input terminal, a second input terminal, a second inverting input terminal, an output terminal, and an inverting output terminal, the two AND gates are respectively referred to as a first AND gate and a second AND gate, and the three buffers are respectively referred to as a first buffer, a second buffer, and a third buffer, the discharge control terminal of the first AND gate, the discharge control terminal of the second AND gate, and an input terminal of the first buffer are connected, and a connecting terminal of the discharge control terminal of the first AND gate, the discharge control terminal of the second AND gate, and the input terminal of the first buffer is a discharge control terminal of the data selector and allows a discharge control signal to be accessed therein, the pre-charge control terminal of the first AND gate, the pre-charge control terminal of the second AND gate, and the input terminal of an second buffer are connected, and a connecting terminal of the pre-charge control terminal of the first AND gate, the pre-charge control terminal of the second AND gate, and the input terminal of the second buffer is a pre-charge control terminal of the data selector and allows a pre-charge control signal to be accessed therein, the evaluation control terminal of the first AND gate, the evaluation control terminal of the second AND gate, and an input terminal of the third buffer are connected, and a connecting terminal of the evaluation control terminal of the first AND gate, the evaluation control terminal of the second AND gate, and the input terminal of the third buffer is an evaluation control terminal of the data selector and allows an evaluation control signal to be accessed therein, an output terminal of the first buffer is connected to the discharge control terminal of the OR gate, an output terminal of the second buffer is connected to the pre-charge control terminal of the OR gate, and an output terminal of the third buffer is connected to the evaluation control terminal of the OR gate, the first input terminal of the first AND gate is a first input terminal of the data selector and allows a first input signal to be accessed therein, the first inverting input terminal of the first AND gate is a first inverting input terminal of the data selector and allows an inversion signal of the first input signal to be accessed therein, the first input terminal of the second AND gate is a second input terminal of the data selector and allows a second input signal to be accessed therein, and the first inverting input terminal of the second AND gate is a second inverting input terminal of the data selector and allows an inversion signal of the second input signal to be accessed therein, the second inverting input terminal of the first AND gate is connected to the second input terminal of the second AND gate, and a connecting terminal of the second inverting input terminal of the first AND gate and the second input terminal of the second AND gate is a selection terminal of the data selector and allows a selection signal to be accessed therein, the second input terminal of the first AND gate is connected to the second inverting input terminal of the second AND gate, and a connecting terminal of the second input terminal of the first AND gate and the second inverting input terminal of the second AND gate is an inverting selection terminal of the data selector and allows an inversion signal of the selection signal to be accessed therein, the output terminal of the first AND gate is connected to the first input terminal of the OR gate, the inverting output terminal of the first AND gate is connected to the first inverting input terminal of the OR gate, the output terminal of the second AND gate is connected to the second input terminal of the OR gate, and the inverting output terminal of the second AND gate is connected to the second inverting input terminal of the OR gate, and the output terminal of the OR gate is an output terminal of the selector, and the inverting output terminal of the OR gate is an inverting output terminal of the selector.

2. A data selector based on TVD according to claim 1, wherein each AND gate comprises: a first PMOS transistor; a second PMOS transistor; a third PMOS transistor; a fourth PMOS transistor; a fifth PMOS transistor; a first NMOS transistor; a second NMOS transistor; a third NMOS transistor; a fourth NMOS transistor; a fifth NMOS transistor; a sixth NMOS transistor; a seventh NMOS transistor; an eighth NMOS transistor; a ninth NMOS transistor; a tenth NMOS transistor; an eleventh NMOS transistor; a twelfth NMOS transistor; a thirteenth NMOS transistor; a fourteenth NMOS transistor; a fifteenth NMOS transistor; a sixteenth NMOS transistor; a seventeenth NMOS transistor; an eighteenth NMOS transistor; a nineteenth NMOS transistor; a twentieth NMOS transistor; and a twenty-first NMOS transistor, wherein a source of the first PMOS transistor is accessed to a power supply, a gate of the first PMOS transistor, a gate of the first NMOS transistor, and a gate of the fourth NMOS transistor are connected, and a connecting terminal of the gate of the first PMOS transistor, the gate of the first NMOS transistor, and the gate of the fourth NMOS transistor is the discharge control terminal of the AND gate, a drain of the first PMOS transistor, a source of the second PMOS transistor, a source of the third PMOS transistor, a source of the fourth PMOS transistor, and a source of the fifth PMOS transistor are connected, a gate of the second PMOS transistor is connected to a gate of the fifth PMOS transistor, and a connecting terminal of the gate of the second PMOS transistor and the gate of the fifth PMOS transistor is the pre-charge control terminal of the AND gate, a drain of the second PMOS transistor, a drain of the third PMOS transistor, a drain of the first NMOS transistor, a drain of the second NMOS transistor, a gate of the fourth PMOS transistor, and a gate of the third NMOS transistor are connected, and a connecting terminal of the drain of the second PMOS transistor, the drain of the third PMOS transistor, the drain of the first NMOS transistor, the drain of the second NMOS transistor, the gate of the fourth PMOS transistor, and the gate of the third NMOS transistor is the output terminal of the AND gate, a gate of the third PMOS transistor, a gate of the second NMOS transistor, a drain of the fourth PMOS transistor, a drain of the third NMOS transistor, a drain of the fifth PMOS transistor, and a drain of the fourth NMOS transistor are connected, and a connecting terminal of the gate of the third PMOS transistor, the gate of the second NMOS transistor, the drain of the fourth PMOS transistor, the drain of the third NMOS transistor, the drain of the fifth PMOS transistor, and a drain of the fourth NMOS transistor is the inverting output terminal of the AND gate, a source of the first NMOS transistor is grounded, a source of the second NMOS transistor, a drain of the fifth NMOS transistor, a drain of the sixth NMOS transistor, a drain of the seventh NMOS transistor, and a drain of the eighth NMOS transistor are connected, a source of the third NMOS transistor, a drain of the ninth NMOS transistor, a drain of the tenth NMOS transistor, a drain of the eleventh NMOS transistor, and a drain of the twelfth NMOS transistor are connected, and a source of the fourth NMOS transistor is grounded, a gate of the fifth NMOS transistor, a gate of the seventh NMOS transistor, a gate of the tenth NMOS transistor, and a gate of the twelfth NMOS transistor are connected, and a connecting terminal of the gate of the fifth NMOS transistor, the gate of the seventh NMOS transistor, the gate of the tenth NMOS transistor, and the gate of the twelfth NMOS transistor is the first input terminal of the AND gate, a source of the fifth NMOS transistor is connected to a drain of the thirteenth NMOS transistor, a gate of the sixth NMOS transistor, a gate of the eighth NMOS transistor, a gate of the ninth NMOS transistor, and a gate of the eleventh NMOS transistor are connected, and a connecting terminal of the gate of the sixth NMOS transistor, the gate of the eighth NMOS transistor, the gate of the ninth NMOS transistor, and the gate of the eleventh NMOS transistor is the first inverting input terminal of the AND gate, a source of the sixth NMOS transistor is connected to a drain of the fourteenth NMOS transistor, a source of the seventh NMOS transistor is connected to a drain of the fifteenth NMOS transistor, a source of the eighth NMOS transistor is connected to a drain of the sixteenth NMOS transistor, a source of the ninth NMOS transistor is connected to a drain of the seventeenth NMOS transistor, a source of the tenth NMOS transistor is connected to a drain of the eighteenth NMOS transistor, a source of the eleventh NMOS transistor is connected to a drain of the nineteenth NMOS transistor, and a source of the twelfth NMOS transistor is connected to a drain of the twentieth NMOS transistor, a gate of the thirteenth NMOS transistor, a gate of the thirteenth NMOS transistor, a gate of the fourteenth NMOS transistor, a gate of the nineteenth NMOS transistor, and a gate of the twentieth NMOS transistor are connected, and a connecting terminal of the gate of the thirteenth NMOS transistor, the gate of the thirteenth NMOS transistor, the gate of the fourteenth NMOS transistor, the gate of the nineteenth NMOS transistor, and the gate of the twentieth NMOS transistor is the second input terminal of the AND gate, a source of the thirteenth NMOS transistor, a source of the fourteenth NMOS transistor, a source of the fifteenth NMOS transistor, a source of the sixteenth NMOS transistor, a source of the seventeenth NMOS transistor, a source of the eighteenth NMOS transistor, a source of the nineteenth NMOS transistor, a source of the twentieth NMOS transistor, and a drain of the twenty-first NMOS transistor are connected, a gate of the fifteenth NMOS transistor, a gate of the sixteenth NMOS transistor, a gate of the seventeenth NMOS transistor, and a gate of the eighteenth NMOS transistor are connected, and a connecting terminal of the gate of the fifteenth NMOS transistor, the gate of the sixteenth NMOS transistor, the gate of the seventeenth NMOS transistor, and the gate of the eighteenth NMOS transistor is the second inverting input terminal of the AND gate, a gate of the twenty-first NMOS transistor is the evaluation control terminal of the AND gate, and a source of the twenty-first NMOS transistor is grounded, and the first PMOS transistor, the second PMOS transistor, the third PMOS transistor, the fourth PMOS transistor, and the fifth PMOS transistor are common-threshold voltage PMOS transistors, the first NMOS transistor, the second NMOS transistor, the third NMOS transistor, the fourth NMOS transistor, and the twenty-first NMOS transistor are common-threshold voltage NMOS transistors, the sixth NMOS transistor, the seventh NMOS transistor, the eighth NMOS transistor, the twelfth NMOS transistor, the fourteenth NMOS transistor, the fifteenth NMOS transistor, the sixteenth NMOS transistor, and the twentieth NMOS transistor are low-threshold voltage NMOS transistors, and the fifth NMOS transistor, the ninth NMOS transistor, the tenth NMOS transistor, the eleventh NMOS transistor, the thirteenth NMOS transistor, the seventeenth NMOS transistor, the eighteenth NMOS transistor, and the nineteenth NMOS transistor are high-threshold voltage NMOS transistors.

3. A data selector based on TVD according to claim 1, wherein the OR gate comprises: a sixth PMOS transistor; a seventh PMOS transistor; an eighth PMOS transistor; a ninth PMOS transistor; a tenth PMOS transistor; a twenty-second NMOS transistor; a twenty-third NMOS transistor; a twenty-fourth NMOS transistor; a twenty-fifth NMOS transistor; a twenty-sixth NMOS transistor; a twenty-seventh NMOS transistor; a twenty-eighth NMOS transistor; a twenty-ninth NMOS transistor; a thirtieth NMOS transistor; a thirty-first NMOS transistor; a thirty-second NMOS transistor; a thirty-third NMOS transistor; a thirty-fourth NMOS transistor; a thirty-fifth NMOS transistor; a thirty-sixth NMOS transistor; a thirty-seventh NMOS transistor; a thirty-eighth NMOS transistor; a thirty-ninth NMOS transistor; a fortieth NMOS transistor; a forty-first NMOS transistor; and a forty-second NMOS transistor, wherein a source of the sixth PMOS transistor is accessed to a power supply, a gate of the sixth PMOS transistor, a gate of the twenty-second NMOS transistor, and a gate of the twenty-fifth NMOS transistor are connected, and a connecting terminal of the gate of the sixth PMOS transistor, the gate of the twenty-second NMOS transistor, and the gate of the twenty-fifth NMOS transistor is the discharge control terminal of the OR gate, a drain of the sixth PMOS transistor, a source of the seventh PMOS transistor, a source of the eighth PMOS transistor, a source of the ninth PMOS transistor, and a source of the tenth PMOS transistor are connected, a gate of the seventh PMOS transistor is connected to a gate of the tenth PMOS transistor, and a connecting terminal of the gate of the seventh PMOS transistor and the gate of the tenth PMOS transistor is the pre-charge control terminal of the OR gate, a drain of the seventh PMOS transistor, a drain of the eighth PMOS transistor, a drain of the twenty-second NMOS transistor, a drain of the twenty-third NMOS transistor, a gate of the ninth PMOS transistor, and a gate of the twenty-fourth NMOS transistor are connected, and a connecting terminal of the drain of the seventh PMOS transistor, the drain of the eighth PMOS transistor, the drain of the twenty-second NMOS transistor, the drain of the twenty-third NMOS transistor, the gate of the ninth PMOS transistor, and the gate of the twenty-fourth NMOS transistor is the output terminal of the OR gate, a gate of the eighth PMOS transistor, a gate of the twenty-third NMOS transistor, a drain of the ninth PMOS transistor, a drain of the twenty-fourth NMOS transistor, a drain of the tenth PMOS transistor, and a drain of the twenty-fifth NMOS transistor are connected, and a connecting terminal of the gate of the eighth PMOS transistor, the gate of the twenty-third NMOS transistor, the drain of the ninth PMOS transistor, the drain of the twenty-fourth NMOS transistor, the drain of the tenth PMOS transistor, and the drain of the twenty-fifth NMOS transistor is the inverting output terminal of the OR gate, a source of the twenty-second NMOS transistor is grounded, a source of the twenty-third NMOS transistor, a drain of the twenty-sixth NMOS transistor, a drain of the twenty-seventh NMOS transistor, a drain of the twenty-eighth NMOS transistor, and a drain of the twenty-ninth NMOS transistor are connected, a source of the twenty-fourth NMOS transistor, a drain of the thirtieth NMOS transistor, a drain of the thirty-first NMOS transistor, a drain of the thirty-second NMOS transistor, and a drain of the thirty-third NMOS transistor are connected, and a source of the twenty-fifth NMOS transistor is grounded, a gate of the twenty-sixth NMOS transistor, a gate of the twenty-eighth NMOS transistor, a gate of the thirty-first NMOS transistor, and a gate of the thirty-third NMOS transistor are connected, and a connecting terminal of the gate of the twenty-sixth NMOS transistor, the gate of the twenty-eighth NMOS transistor, the gate of the thirty-first NMOS transistor, and the gate of the thirty-third NMOS transistor is the first input terminal of the OR gate, a source of the twenty-sixth NMOS transistor is connected to a drain of the thirty-fourth NMOS transistor, a gate of the twenty-seventh NMOS transistor, a gate of the twenty-ninth NMOS transistor, a gate of the thirtieth NMOS transistor, and a gate of the thirty-second NMOS transistor are connected, and a connecting terminal of the gate of the twenty-seventh NMOS transistor, the gate of the twenty-ninth NMOS transistor, the gate of the thirtieth NMOS transistor, and the gate of the thirty-second NMOS transistor is the first inverting input terminal of the OR gate, a source of the twenty-seventh NMOS transistor is connected to a drain of the thirty-fifth NMOS transistor, a source of the twenty-eighth NMOS transistor is connected to a drain of the thirty-sixth NMOS transistor, a source of the twenty-ninth NMOS transistor is connected to a drain of the thirty-seventh NMOS transistor, a source of the thirtieth NMOS transistor is connected to a drain of the thirty-eighth NMOS transistor, a source of the thirty-first NMOS transistor is connected to a drain of the thirty-ninth NMOS transistor, a source of the thirty-second NMOS transistor is connected to a drain of the fortieth NMOS transistor, and a source of the thirty-third NMOS transistor is connected to a drain of the forty-first NMOS transistor, a gate of the thirty-fourth NMOS transistor, a gate of the thirty-fifth NMOS transistor, a gate of the fortieth NMOS transistor, and a gate of the forty-first NMOS transistor are connected, and a connecting terminal of the gate of the thirty-fourth NMOS transistor, the gate of the thirty-fifth NMOS transistor, the gate of the fortieth NMOS transistor, and the gate of the forty-first NMOS transistor is the second input terminal of the OR gate, a source of the thirty-fourth NMOS transistor, a source of the thirty-fifth NMOS transistor, a source of the thirty-sixth NMOS transistor, a source of the thirty-seventh NMOS transistor, a source of the thirty-eighth NMOS transistor, a source of the thirty-ninth NMOS transistor, a source of the fortieth NMOS transistor, a source of the forty-first NMOS transistor, and a drain of the forty-second NMOS transistor are connected, a gate of the thirty-sixth NMOS transistor, a gate of the thirty-seventh NMOS transistor, a gate of the thirty-eighth NMOS transistor, and a gate of the thirty-ninth NMOS transistor are connected, and a connecting terminal of the gate of the thirty-sixth NMOS transistor, the gate of the thirty-seventh NMOS transistor, the gate of the thirty-eighth NMOS transistor, and the gate of the thirty-ninth NMOS transistor is the second inverting input terminal of the OR gate, a gate of the forty-second NMOS transistor is the evaluation control terminal of the OR gate, and a source of the forty-second NMOS transistor is grounded, and the sixth PMOS transistor, the seventh PMOS transistor, the eighth PMOS transistor, the ninth PMOS transistor, and the tenth PMOS transistor are common-threshold voltage PMOS transistors, the twenty-second NMOS transistor, the twenty-third NMOS transistor, the twenty-fourth NMOS transistor, the twenty-fifth NMOS transistor, and the forty-second NMOS transistor are common-threshold voltage NMOS transistors, the twenty-ninth NMOS transistor, the thirty-first NMOS transistor, the thirty-second NMOS transistor, the thirty-third NMOS transistor, the thirty-seventh NMOS transistor, the thirty-ninth NMOS transistor, the fortieth NMOS transistor, and the forty-first NMOS transistor are low-threshold voltage NMOS transistors, and the twenty-sixth NMOS transistor, the twenty-seventh NMOS transistor, the twenty-eighth NMOS transistor, the thirtieth NMOS transistor, the thirty-fourth NMOS transistor, the thirty-fifth NMOS transistor, the thirty-sixth NMOS transistor, and the thirty-eighth NMOS transistor are high-threshold voltage NMOS transistors.

4. A data selector based on TVD according to claim 2, wherein the common-threshold voltage PMOS transistors have a threshold voltage of −0.404V, the common-threshold voltage NMOS transistors have a threshold voltage of 0.397V, the low-threshold voltage NMOS transistors have a threshold voltage of 0.243V, and the high-threshold voltage NMOS transistors have a threshold voltage of 0.489V.

5. A data selector based on TVD according to claim 3, wherein the common-threshold voltage PMOS transistors have a threshold voltage of −0.404V, the common-threshold voltage NMOS transistors have a threshold voltage of 0.397V, the low-threshold voltage NMOS transistors have a threshold voltage of 0.243V, and the high-threshold voltage NMOS transistors have a threshold voltage of 0.489V.

* * * * *